(12) United States Patent
Harrell et al.

(10) Patent No.: US 10,814,793 B2
(45) Date of Patent: Oct. 27, 2020

(54) ROOF-TOP RAIL SYSTEM FOR VEHICLE CARGO STORAGE

(71) Applicant: CurrentWrx, LLC, St. George, UT (US)

(72) Inventors: Brad Harrell, St. George, UT (US); Patrick Williams, St. George, UT (US); Brian Stevens, St. George, UT (US); Jordy Pincock, St. George, UT (US); Doyle Hansen, St. George, UT (US)

(73) Assignee: Currentwrx, LLC, Saint George, UT (US)

( * ) Notice: Subject to any disclaimer, the term of this patent is extended or adjusted under 35 U.S.C. 154(b) by 0 days.

(21) Appl. No.: 16/173,947

(22) Filed: Oct. 29, 2018

(65) Prior Publication Data
US 2019/0126838 A1  May 2, 2019

Related U.S. Application Data

(60) Provisional application No. 62/578,383, filed on Oct. 27, 2017.

(51) Int. Cl.
*B60R 9/042* (2006.01)
*B60P 1/32* (2006.01)

(52) U.S. Cl.
CPC .............. *B60R 9/042* (2013.01); *B60P 1/32* (2013.01)

(58) Field of Classification Search
CPC .................................. B60R 9/042; B60P 1/32

USPC ........................................................ 224/310
See application file for complete search history.

(56) References Cited

U.S. PATENT DOCUMENTS

| | | | | |
|---|---|---|---|---|
| 2,765,940 A | * | 10/1956 | Nelson | B60P 3/1025 414/462 |
| 2,931,528 A | * | 4/1960 | Mabry | B60P 3/1025 414/462 |
| 4,181,351 A | | 1/1980 | Spanke | |
| 4,236,860 A | * | 12/1980 | Gottlieb | A61G 3/0209 414/462 |
| 4,484,851 A | * | 11/1984 | Gottlieb | A61G 3/0209 414/462 |
| 4,647,110 A | * | 3/1987 | McKee | B60P 1/32 298/1 A |
| 5,143,496 A | | 9/1992 | Smith et al. | |
| 5,423,650 A | * | 6/1995 | Zerbst | B60R 9/042 224/310 |
| 5,846,045 A | * | 12/1998 | Johnson | B60P 1/6454 414/462 |
| 5,868,453 A | | 2/1999 | Steigner | |
| 6,158,638 A | | 12/2000 | Szigeti | |
| 6,371,564 B1 | | 4/2002 | Yates et al. | |

(Continued)

*Primary Examiner* — Justin M Larson
(74) *Attorney, Agent, or Firm* — Gurr Brande & Spendlove, PLLC; Robert D. Spendlove

(57) ABSTRACT

A roof-top rail system has a fixed frame mountable to the roof of a vehicle and a moveable frame mounted to the fixed frame. Bearings attached to the frames may engage channels formed in rails of the other frame in a manner such that as the moveable frame slides backward relative to the fixed frame, the moveable frame extends from the back side of the fixed frame. Simultaneously, a back end of the moveable frame rotates down as it extends from the fixed frame to improve access to cargo securing features of the moveable frame.

17 Claims, 12 Drawing Sheets

(56) References Cited

U.S. PATENT DOCUMENTS

| | | | |
|---|---|---|---|
| 6,676,220 B2* | 1/2004 | Mistler | B60P 1/28 |
| | | | 298/1 A |
| 7,513,730 B2* | 4/2009 | Goyanko | B60R 9/042 |
| | | | 224/310 |
| 7,780,050 B2* | 8/2010 | Tucker | B60R 9/042 |
| | | | 224/309 |
| 8,113,562 B2* | 2/2012 | Skoglun | B62D 33/08 |
| | | | 224/405 |
| 8,191,952 B2* | 6/2012 | Mokhtari | B60R 9/00 |
| | | | 224/405 |
| 8,322,580 B1* | 12/2012 | Hamilton | B60R 9/042 |
| | | | 224/309 |
| 9,227,547 B2* | 1/2016 | Williams | B60P 1/6427 |
| 9,409,526 B2* | 8/2016 | Giamatti | B60R 9/042 |
| 9,457,727 B2* | 10/2016 | Hobbs | B60R 9/06 |
| 9,610,881 B2* | 4/2017 | Williams | B60P 1/6427 |
| 10,071,668 B2* | 9/2018 | Zerbst | B60P 1/32 |
| 10,189,417 B1* | 1/2019 | Morken | B60R 9/042 |
| 10,293,734 B2* | 5/2019 | Nash | B60P 1/32 |
| 2003/0015906 A1 | 1/2003 | Mistler | |
| 2011/0062736 A1 | 3/2011 | Skoglun | |
| 2011/0127790 A1 | 6/2011 | Mokhtari et al. | |
| 2011/0202199 A1* | 8/2011 | Crane | B60P 3/122 |
| | | | 701/2 |
| 2012/0263561 A1 | 10/2012 | Li | |
| 2015/0132090 A1 | 5/2015 | Giamatti | |
| 2017/0341590 A1* | 11/2017 | McLauchlan | B60R 9/042 |
| 2019/0126838 A1* | 5/2019 | Harrell | B60R 9/042 |

* cited by examiner

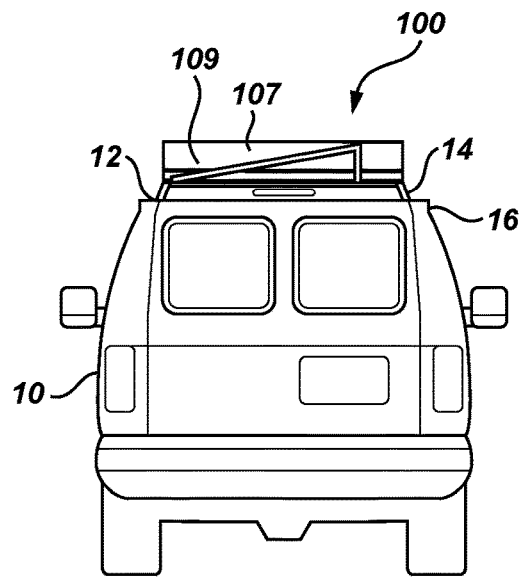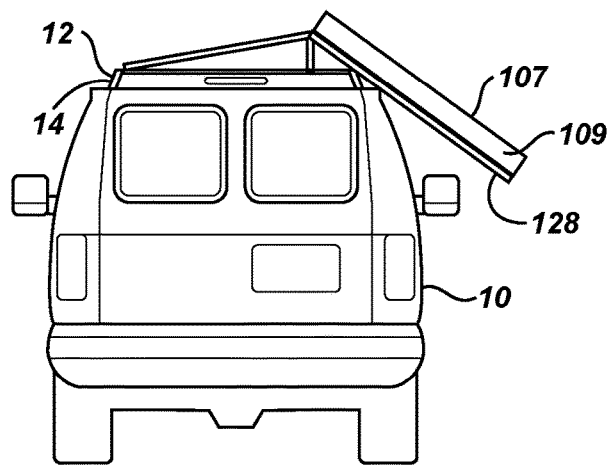
Fig. 1  Fig. 2
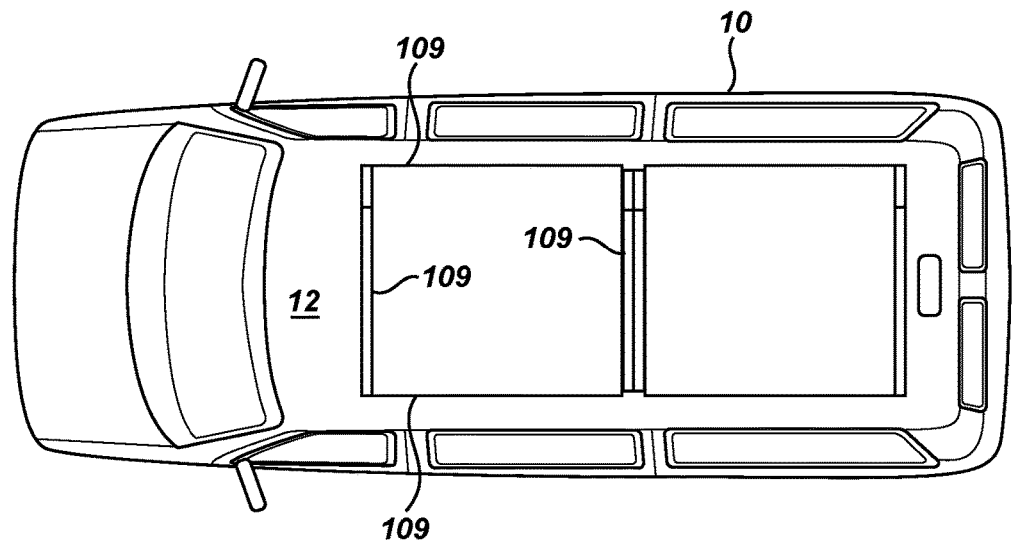
Fig. 3

ROOF-TOP RAIL SYSTEM FOR VEHICLE CARGO STORAGE

CROSS-REFERENCE TO RELATED APPLICATIONS

This application claim priority to U.S. Provisional Patent Application No. 62/578,383 filed Oct. 27, 2017 and titled "Roof-Top System for Vehicle Cargo Storage," which provisional application is incorporated herein by reference in its entirety.

TECHNICAL FIELD

The present disclosure relates to storage and cargo-hauling systems for vehicles. More particularly, the present disclosure relates to a rail system that can be lowered from the top of the vehicle for convenient access.

BACKGROUND

In today's society, people are driving more and more each year and are driving farther distances. In many vehicles, storage space is at a premium and many people are interested in transporting large cargo that won't fit within the vehicle, such as bicycles, furniture, large luggage, building supplies, etc. Even if such items can fit within the vehicle, it will significantly reduce the number of passengers who can ride in the vehicle. One option to increase cargo and passenger space is to stow and transport cargo on the roof of the vehicle.

Attempts in the prior art have been made to solve the problem of a lack of cargo space, but these attempts fall short and actually create additional complications. For example, storage and cargo-hauling mechanisms have been developed wherein items are stored and hauled on the roof of the vehicle. However, many of these items are heavy and/or awkward to maneuver and the storage and cargo-hauling mechanisms are difficult to access on the roof. This requires a user to risk damage to his vehicle while trying to attach items to a vehicle's roof, or to use a ladder to gain better access, which puts the user at risk of a fall. A ladder presents the additional problem that, in order to get close enough to a vehicle, the ladder must be placed parallel thereto, which forces the user to turn awkwardly as he stows or removes cargo. Even with a ladder, a user must hoist items above the vehicle and he risks dropping the item on the vehicle and causing damage. Further, stowing or removing heavy and/or awkward items requires more than one person, and using two ladders is not only cumbersome, but it is also puts two people at risk of a fall. Due to the inconvenience of a large ladder, it can be expected that users will use more convenient methods to gain access to the roof of a vehicle, such as a stool, bucket, milk crate, etc., even though such methods would be even more dangerous than a ladder.

As such, despite the prior art's attempts, there still remains a need for a vehicle rail system that allows for safe and convenient access to the rail system and which reduces the risk of damage to a vehicle. There is a need for a storage system that does not require a user to hoist heavy items over his head or require the use of a ladder, stool, bucket, milk crate, etc. to access the storage area on the roof of a vehicle. The present disclosure seeks to solve these and other problems.

BRIEF DESCRIPTION OF THE DRAWINGS

FIG. 1 is a rear view of a vehicle having a rail system in accordance with an embodiment of the present invention, where the rail system is in a retracted position.

FIG. 2 is a rear view of a vehicle having a rail system in accordance with the embodiment of FIG. 1, where the rail system is in an extended position.

FIG. 3 is a top view of a vehicle having a rail system in accordance with the embodiment of FIG. 1, where the rail system is in a retracted position.

DETAILED DESCRIPTION OF EXAMPLE EMBODIMENTS

Figure 4:
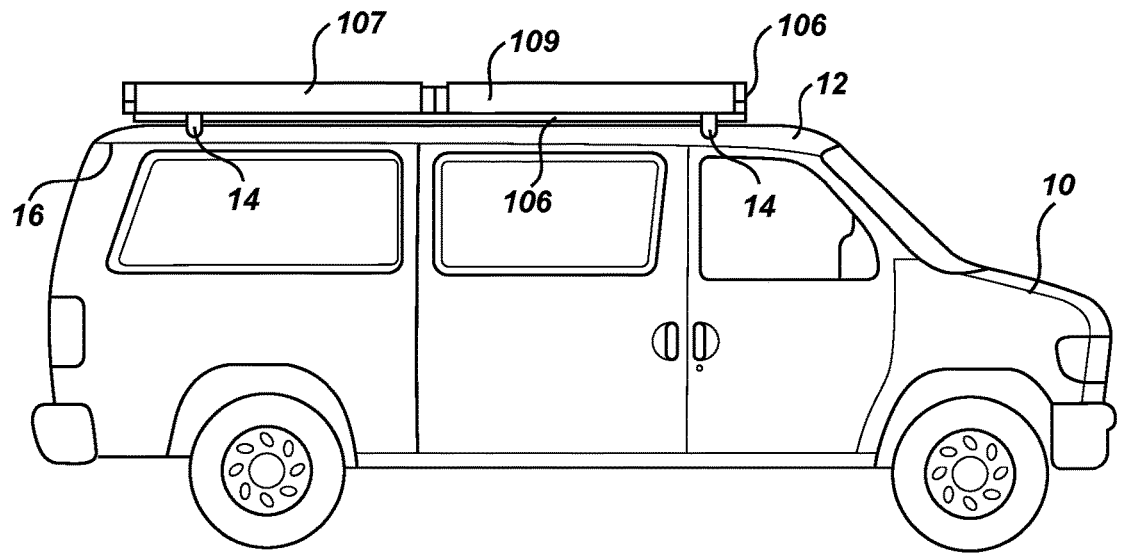
FIG. 4 is a side view of a vehicle having a rail system in accordance with the embodiment of FIG. 1, where the rail system is in a retracted position.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a roof-top rail system that allows for cargo storage on the roof of a vehicle without having to hoist cargo over the user's head or climbing on a ladder, stool, bucket, etc. to gain access to the roof-top storage area. The extendable rail system may be motorized for ease of extension and access. As will be appreciated from the below disclosure, the roof-top rail system shown and described herein solves these needs and others.

As illustrated in FIGS. 1-5, embodiments of the present invention comprise a rail system 100. The rail system 100 may be attached the roof 12 of a vehicle 10. Embodiments of the rail system comprise a first, fixed frame 106 that mounts to the roof. The fixed frame 106 may be mounted to and spaced apart from the roof by brackets 14. The brackets may engage the roof surface or may engage a drip rail 16 or other feature of the vehicle roof or sides. Alternatively, the fixed frame 106 may be mounted directly to the roof 12. The frame 106 or the brackets may be affixed to the roof or sides of the vehicle using screw, bolts, adhesives or other appropriate means. While this application will refer to mounting on the roof of a vehicle, it should be understood that the rail system may be attached to other generally horizontal surfaces or areas of a vehicle, such as across the bed of a pick-up.

Figure 5:
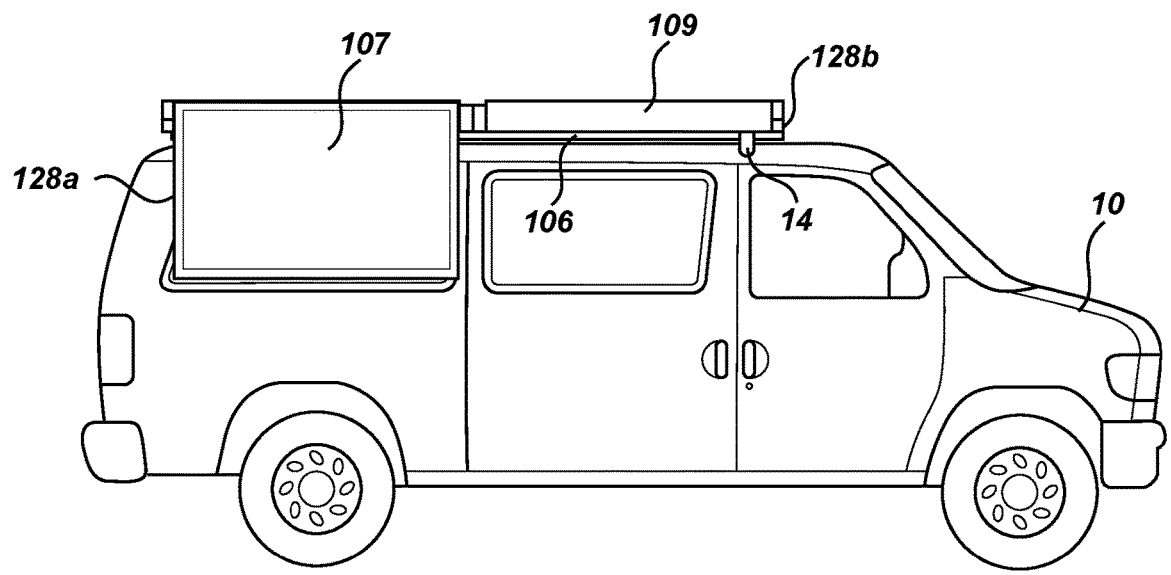
FIG. 5 is a side view of a vehicle having a rail system in accordance with the embodiment of FIG. 1, where a portion of the rail system is in an extended position.

The rail system further comprises a second, moving frame 128. The moving frame is movably attached to the fixed frame 106. The moveable frame 128 is connected with the fixed frame 106 in a manner that allows the moveable frame to both rotate and translate with respect to the fixed frame. Accordingly, the moveable frame is movable from a retracted position, in which the moveable frame is positioned generally horizontally and over the vehicle roof as shown in FIGS. 1 and 3-4, and an extended position, in which the moveable frame has translated so that at least a portion of the moveable frame extends beyond the vehicle roof and has rotated so that a back end 104 of the frame is lower than a front end 102 of the moveable frame 106 as shown in FIGS. 2 and 5.

The rail system 100 may comprise a single moveable frame 128 mounted to a single fixed frame 106. Alternatively, as illustrated in FIGS. 3-5, the rail system 100 may comprise two or more moveable frames 128a, 128b mounted to a single fixed frame 106 such that the moveable frames may be moved independently between the retracted and extended positions. Further embodiments of the rail system 100 may comprise cargo securing features that extend upward or outward from the moveable frame 106. For example, the rail system may compromise a basket 107 having one or more side panels 109 that extend upwardly from the moveable frame 128. In addition, Embodiments of the invention illustrated in the figures show the moveable frame 128 extending outwardly from a side of the example vehicle. However, it should be understood the moveable frame may extend from the rear or front of the vehicle. Additionally, in embodiments where more than one moveable frame is used, the frames may extend outwardly in different directions, for example, from opposite sides of the vehicle or one frame may extend from the side while another extends from the vehicle rear.

In embodiments of the rail system 100 as illustrated, for example, in FIGS. 6-9, the fixed frame 106 comprises one or more side rails 108. In embodiments comprising multiple side rails, the rails may be generally parallel to one another. The fixed frame may also comprise one or more cross bars 110 that extend between parallel side rails. The cross bars 110 may provide support and/or rigidity to the fixed frame 106. The fixed frame may further comprise a support post 112 attached adjacent or near a back end 140 of the side rail 108. A roller or other bearing 114 may be attached to and extend from an inside surface of the support post 112. The bearing 114 may be attached to the support post 112 by a shaft 142. The shaft 142 may be or comprise a bolt, rod, axle or other attachment and support means. Alternatively, the bearing 114 may be attached to an inside surface of the side rail 108.

Embodiments of the fixed frame 106 may further comprise one or more angled support rails 118. The angled rail 118 may be attached to the side rail 108 at the side rail front end 144. The angled rail may extend upwardly from the side rail such that the distance between the side rail 108 and angled rail 118 increases from the front 102 to the back 104 of the rail system 100. The angled rail 118 may comprise a rail having a C-shaped section or otherwise forming a channel 156 capable of accommodating a roller or other bearing. A support link 146 may extend between the side rail 108 and the angled rail 118.

In embodiments of the rail system 100, the moveable frame 128 comprises one or more slide rails 130. In embodiments comprising multiple slide rails 130, the rails may be generally parallel to one another. The moveable frame 128 may also comprise one or more cross bars 148 that extend between parallel slide rails. The slide rails 130 may comprise a C-shaped section or otherwise form a channel capable of accommodating a roller or other bearing. The bearing 114 of the fixed frame 106 may be positioned in the channel to allow sliding motion of the moveable frame 128 relative to the fixed frame.

The moveable frame 128 may further comprise a roller or other bearing 150 that may be attached to and extend from an outside surface of the slide rail 130. The bearing may be attached at or near a forward end 154 of the slide rail 130. The bearing 150 may be attached to the slide rail by a shaft 152. The shaft 152 may be or comprise a bolt, rod, axle or other attachment and support means. The bearing 150 may engage the channel 156 of the angled support rail 118 in a manner that allows the forward end of the moveable frame 128 to transition relative to the fixed frame 106. Alternatively, the bearing 150 may be attached to and extend from an inside surface of the angled rail 118 and engage the channel 132 of the slide rail 130.

Figure 6:
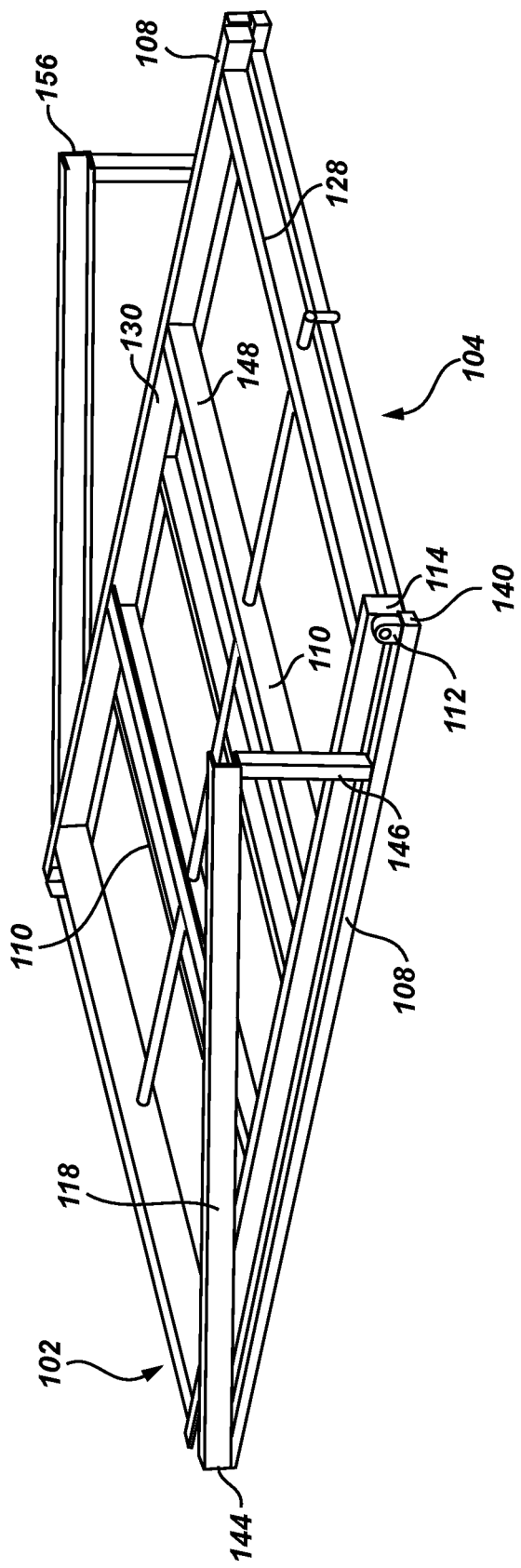
FIG. 6 is a perspective view of a rail system in accordance with an embodiment of the present invention, where the rail system is in a retracted position.
Figure 7:
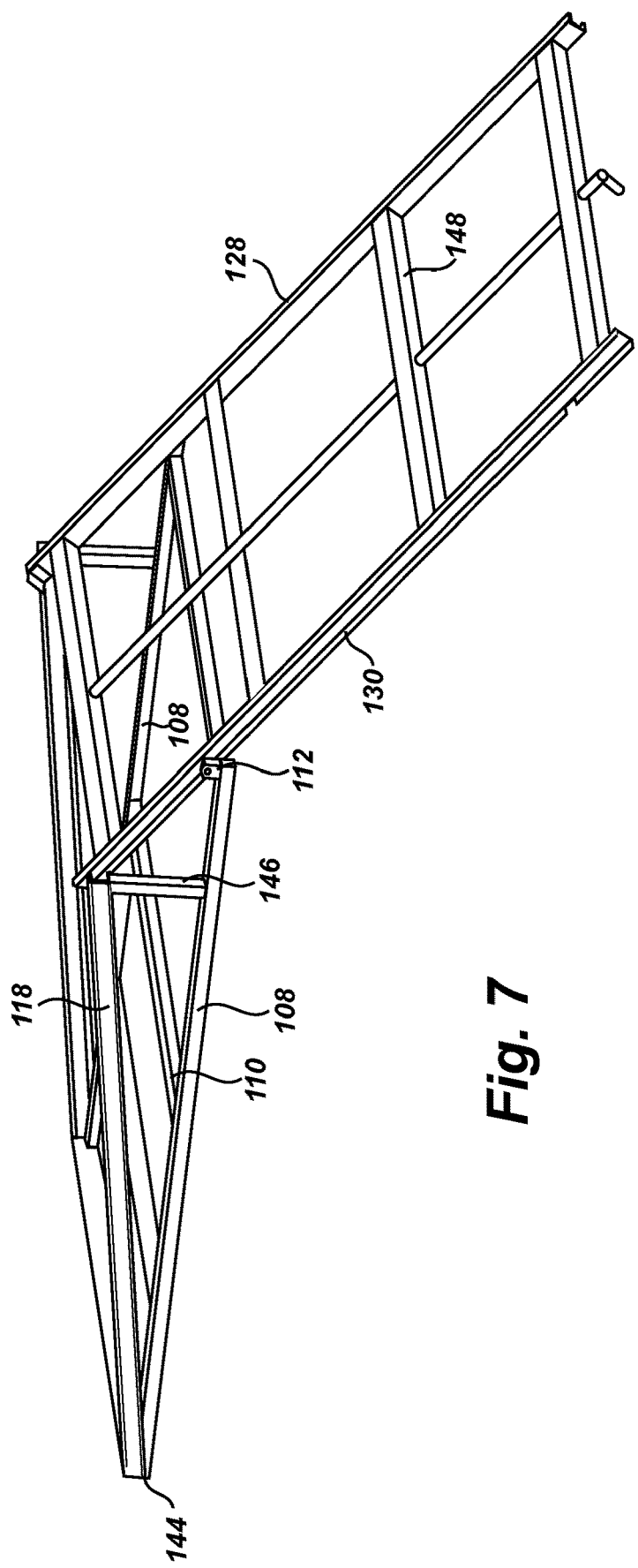
FIG. 7 is a perspective view of a rail system in accordance with the embodiment of FIG. 6, where the rail system is in an extended position.
Figure 8:
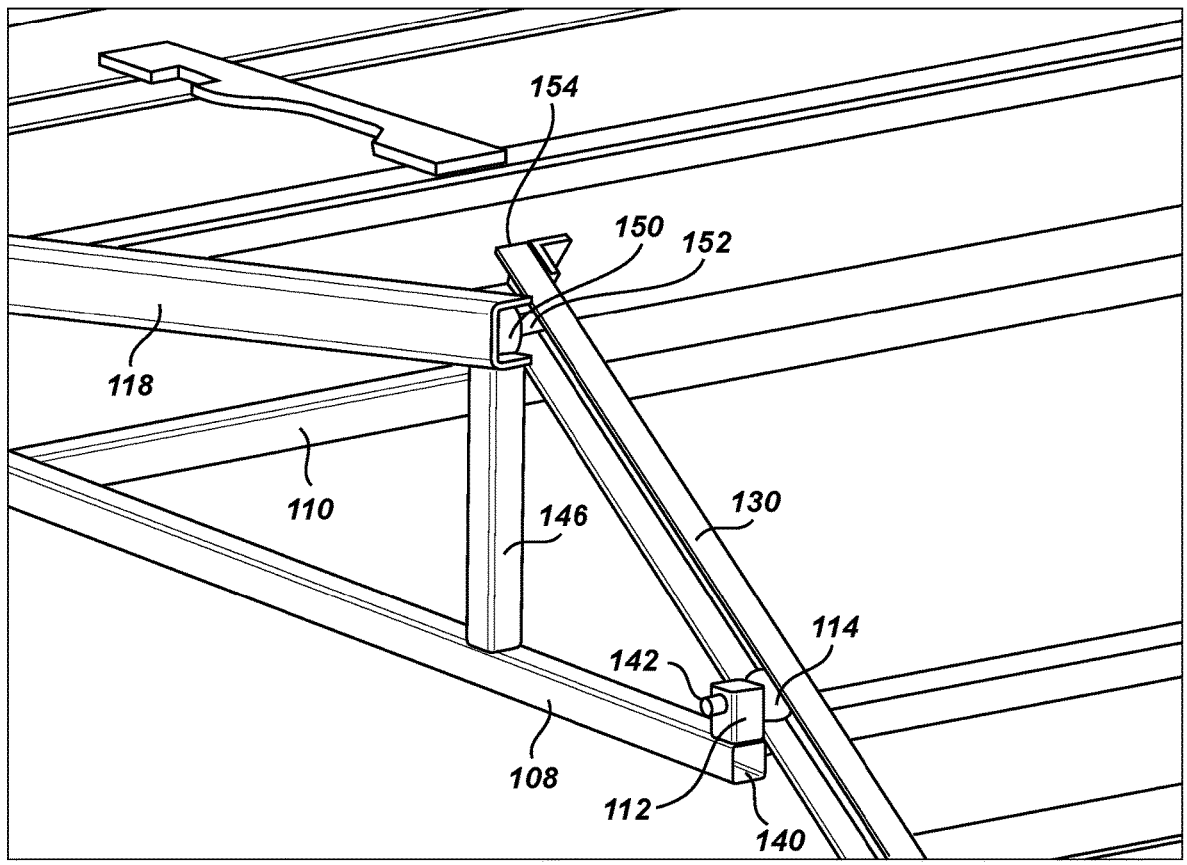
FIG. 8 is a partial perspective view showing details of a rail system in accordance with the embodiment of FIG. 6, where the rail system is in an extended position.
Figure 9:
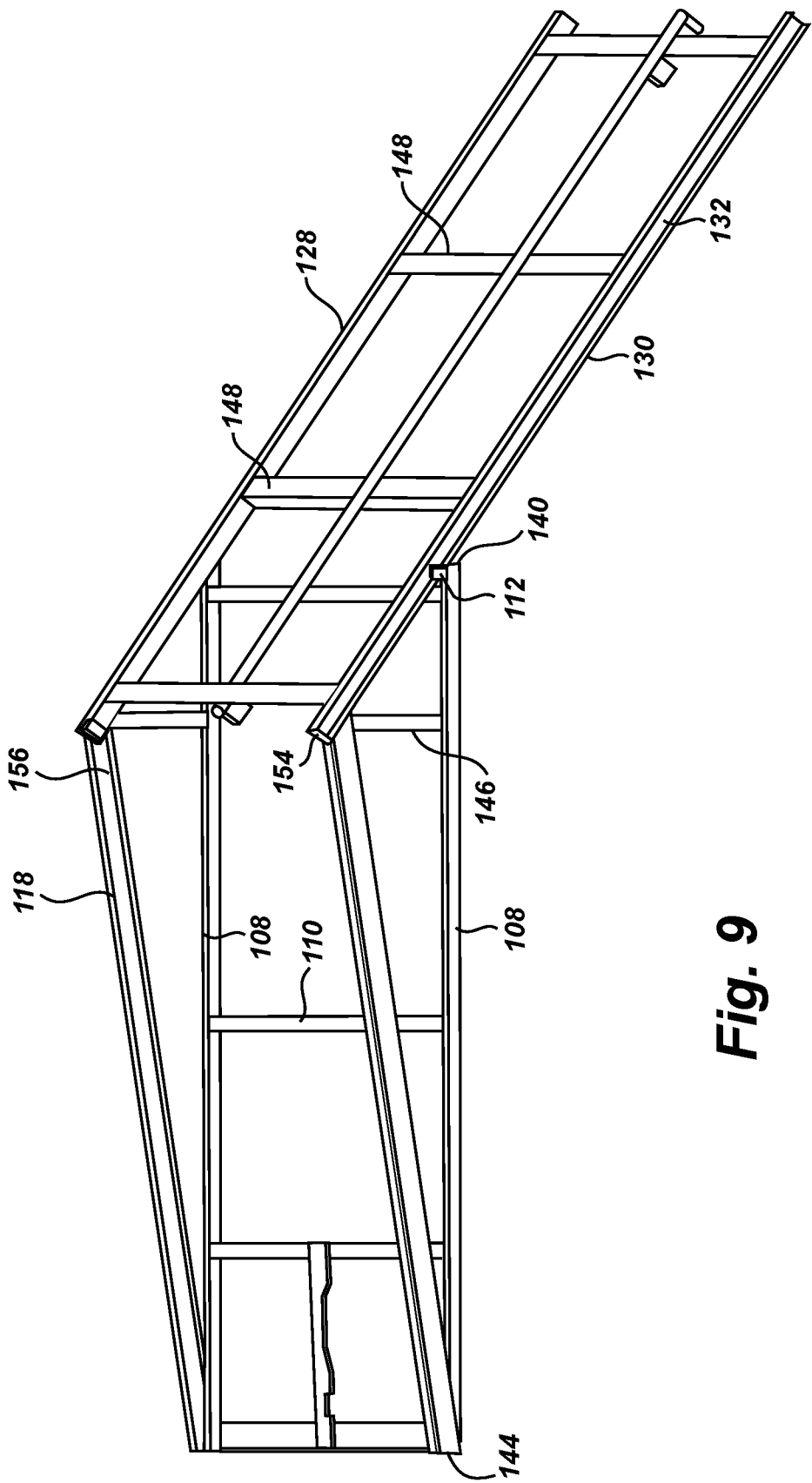
FIG. 9 is a side perspective view of a rail system in accordance with the embodiment of FIG. 6, where the rail system is in an extended position.
Figure 10:
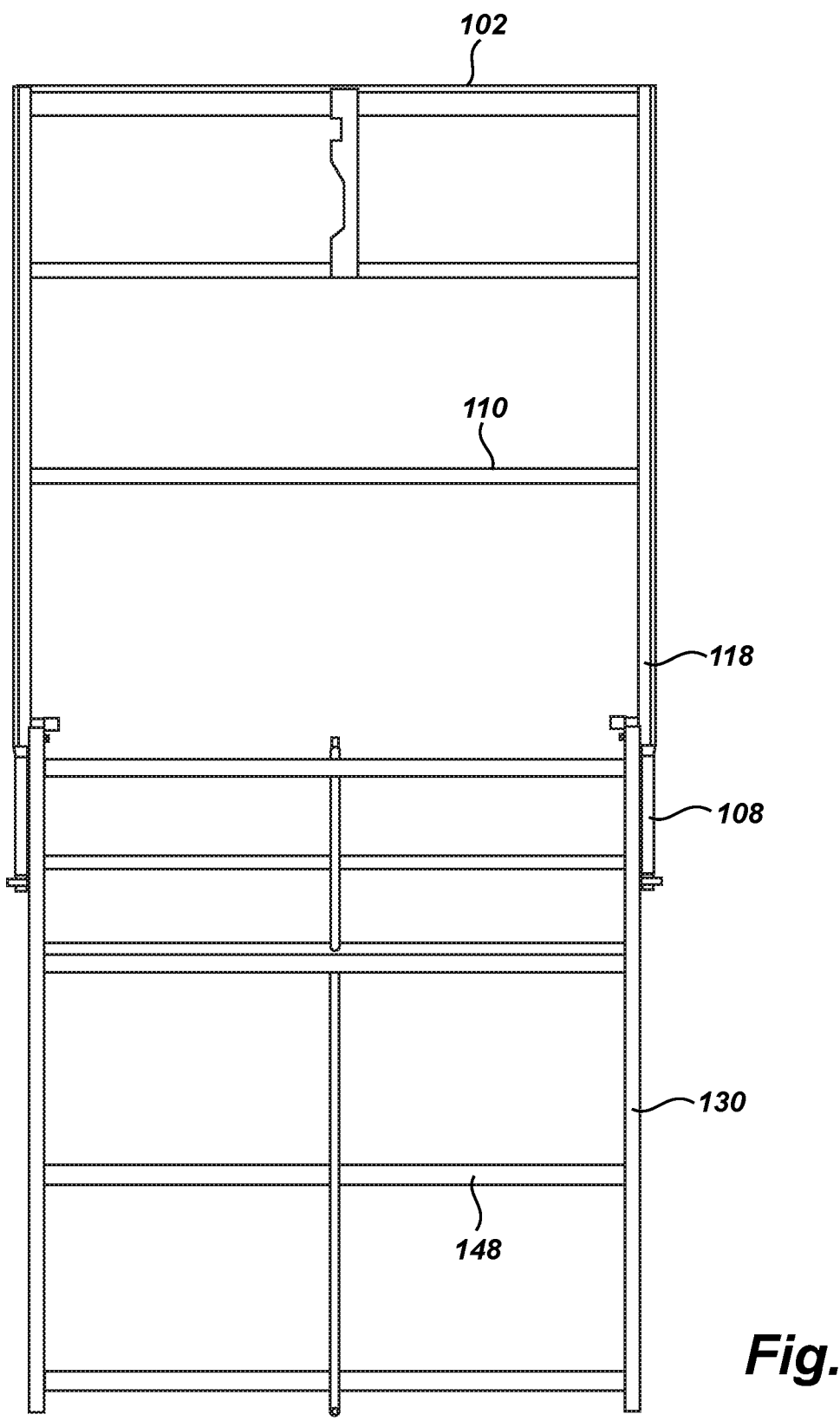
FIG. 10 is a top view of a rail system in accordance with the embodiment of FIG. 6, where the rail system is in an extended position.
Figure 11:
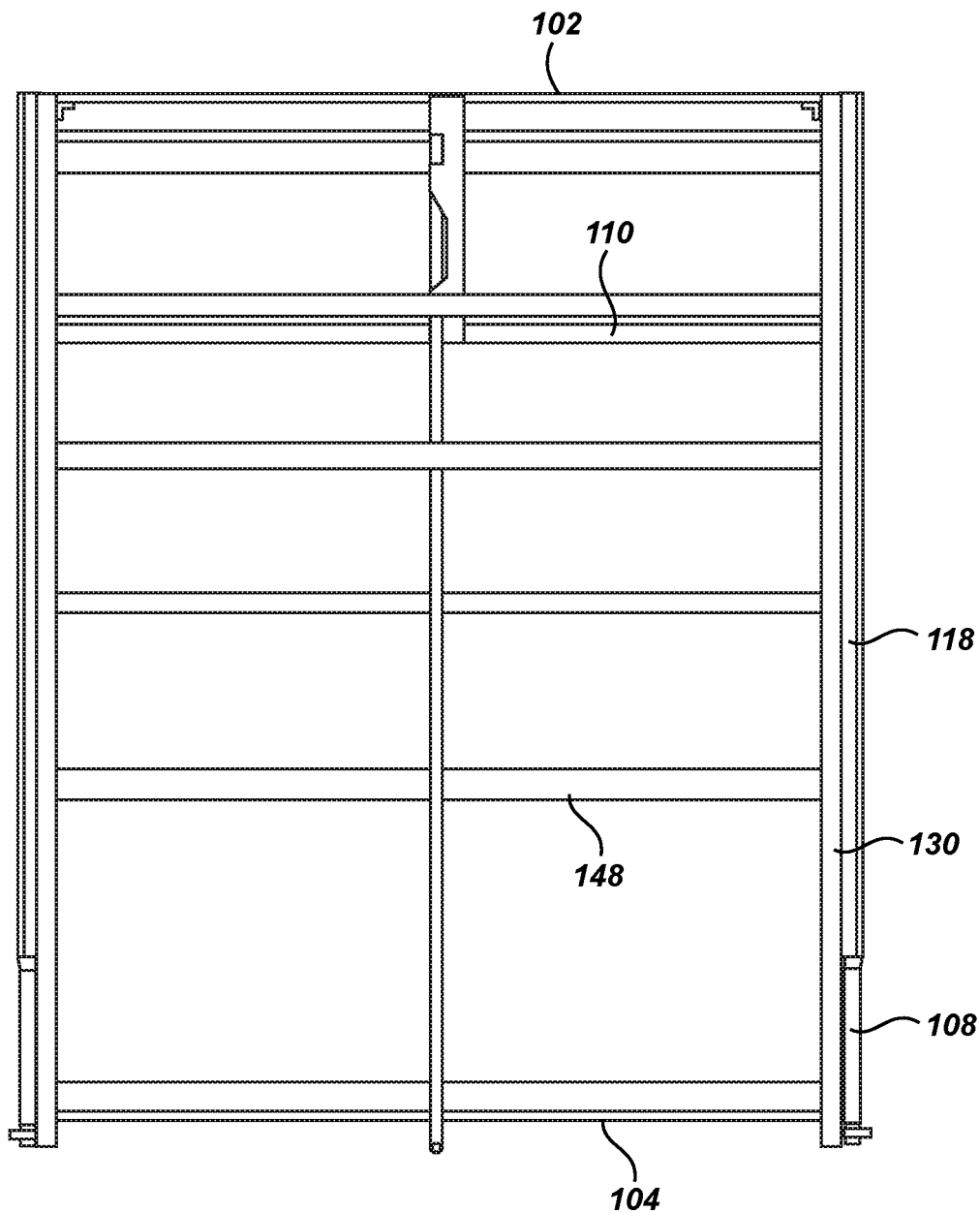
FIG. 11 is a top view of a rail system in accordance with the embodiment of FIG. 6, where the rail system is in a retracted position.
Figure 12:
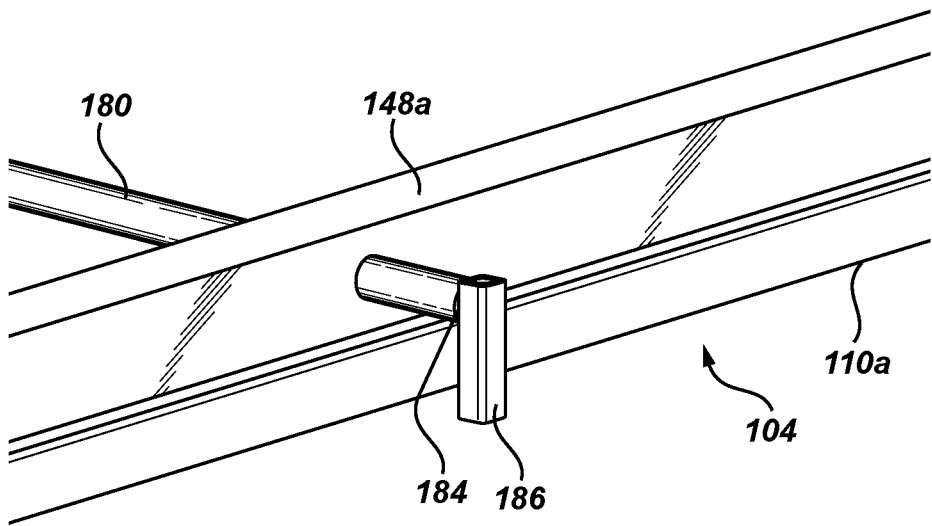
FIG. 12 is a partial perspective view of a portion of a latch mechanism for use with embodiments of a rail system.
Figure 13:
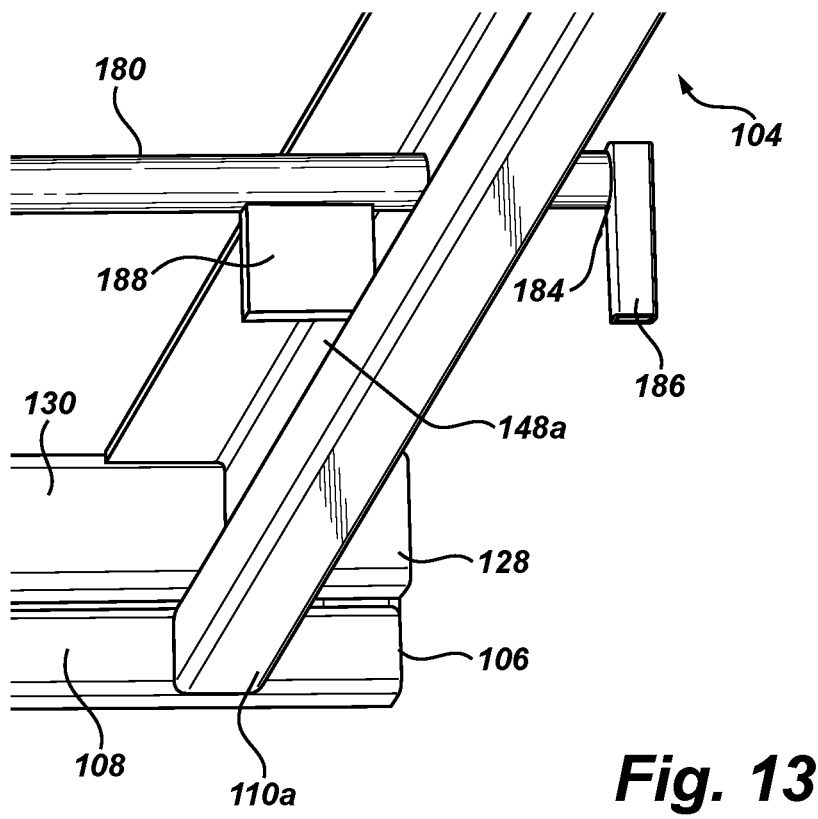
FIG. 13 is a partial perspective view of the portion of the latch mechanism in accordance with the embodiment of FIG. 12.
Figure 14:
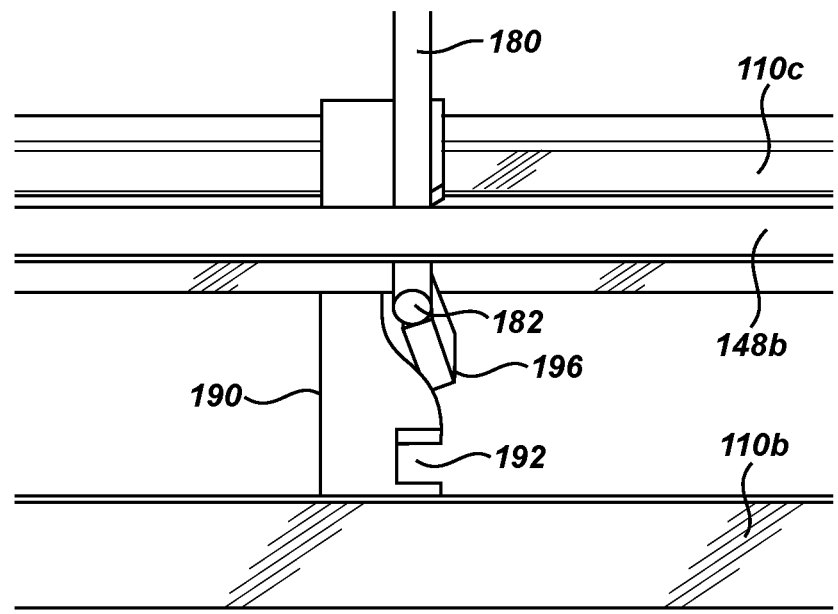
FIG. 14 is a partial perspective view of further portion of a latch mechanism for use with embodiments of a rail system.
Figure 15:
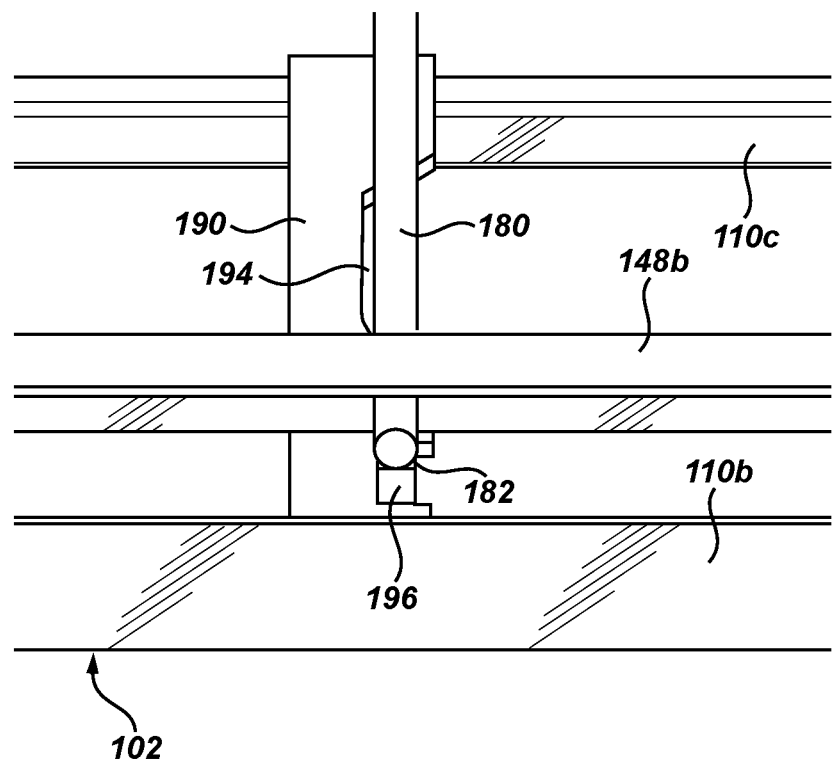
FIG. 15 is a partial perspective view of the portion of the latch mechanism in accordance with the embodiment of FIG. 14.

In embodiments of the rail system as illustrated by FIGS. 6-7, the bearing 114 of the fixed frame 106 is engaged in the channel 132 of the moveable frame slide rail 130. Simultaneously, the bearing 150 of the moveable frame 128 is engaged in the channel 156 of the angled support rail 118. Accordingly, as the moveable frame slides backward relative to the fixed frame, the moveable frame extends from the back side 104 of the fixed frame. At the same time, the slide rail bearing 150 moves backward and upward along the angled rail 118. This causes the moveable frame to rotate down as it extends from the fixed frame.

Figure 16:
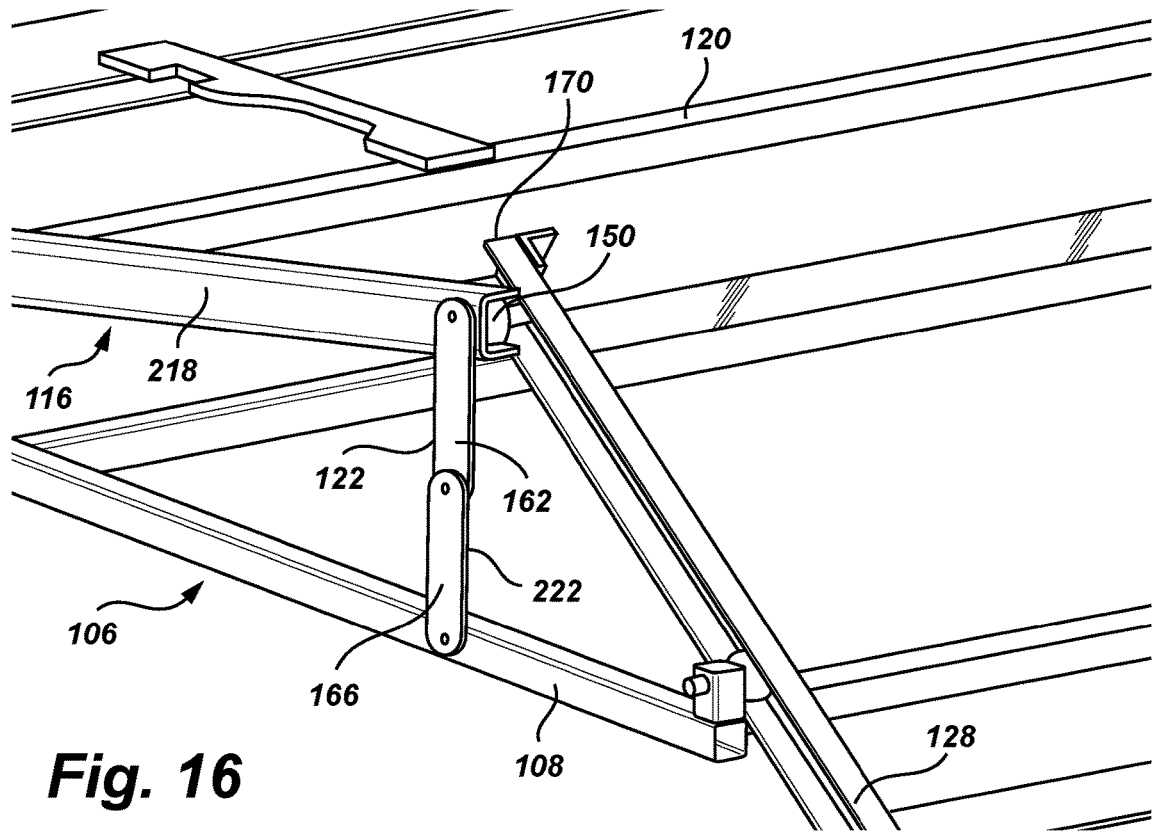
FIG. 16 is a partial perspective view of a portion of a rail system in accordance with an embodiment of the present invention, where the rail system is in an extended position.
Figure 17:
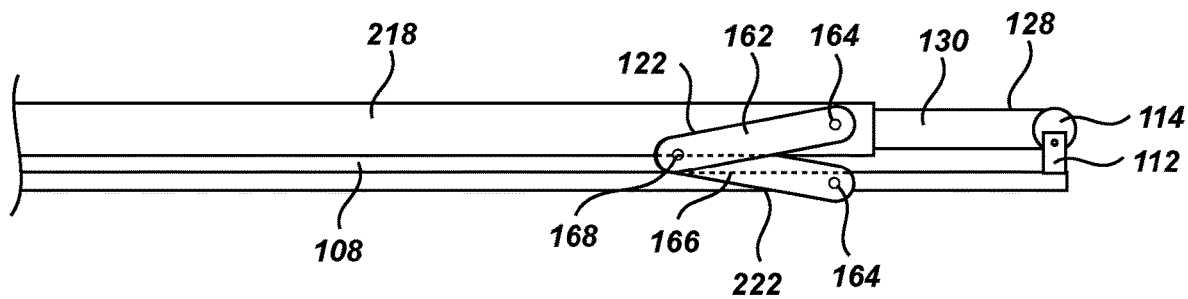
FIG. 17 is a side view of a portion of a rail system in accordance with the embodiment of FIG. 16, where the rail system is in a retracted position.

In alternative embodiments of the rail system as illustrated in FIGS. 16-17, the angled support rails 118 are replaced by a rotating frame 116 that is hingedly coupled to the fixed frame 106 at the front end of the fixed frame. The rotating frame 116 comprises one or more rotating support rails 218 that extend generally parallel to the fixed frame side rails 108 when the moveable frame 128 is in the retracted position (see FIG. 17). The rotating frame may also comprise a cross bar 120 for providing support and/or rigidity to the rotating frame 116. A retaining link 122 may extend between the fixed frame side rail 108 and the rotating support rail 218. The retaining link 122 may comprise a scissor hinge 222 attached to outer surfaces of the rails 118, 218. The scissor hinge may comprise a first link 162 attached to the rotating support rail 218 by a bolt 164 or other fastener. The scissor hinge may comprise a second link 166 attached to the fixed frame side rail 108 by a bolt 164 or other fastener. The two links 162, 166 may further be attached to one another by an additional bolt 168 or other fastener. The bolts 164, 168 allow rotation of the respective links 162, 166.

Accordingly, as the moveable frame 128 slides backward relative to the fixed frame 106, the moveable frame extends from the back side 104 of the fixed frame. At the same time, the slide rail bearing 150 moves backward along the rotating support rail 218. The weight of the moveable frame causes the moveable frame to rotate down as it extends from the fixed frame. Because the roller 114 is engaged in the channel of slide rail 130, the font end 170 of the moveable frame moves upward. As the front of the moveable frame moves upward, the bearing 150 applies a force to the rotating frame 116, and the rotating frame rotates upward. The scissor hinge 222 straightens until it has reached its limit, thereby limiting the rotation of the rotating frame 116.

Figure 18:
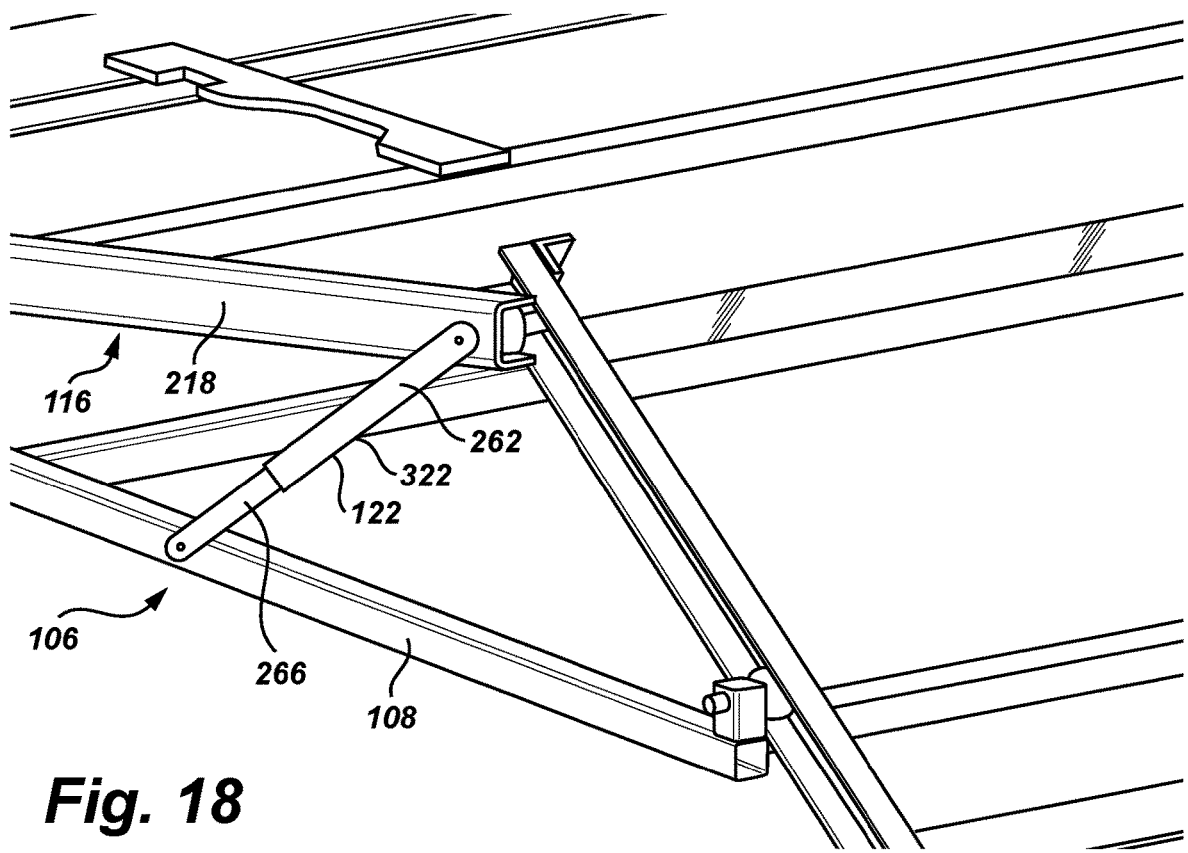
FIG. 18 is a partial perspective view of a portion of a rail system in accordance with an embodiment of the present invention, where the rail system is in an extended position.
Figure 19:
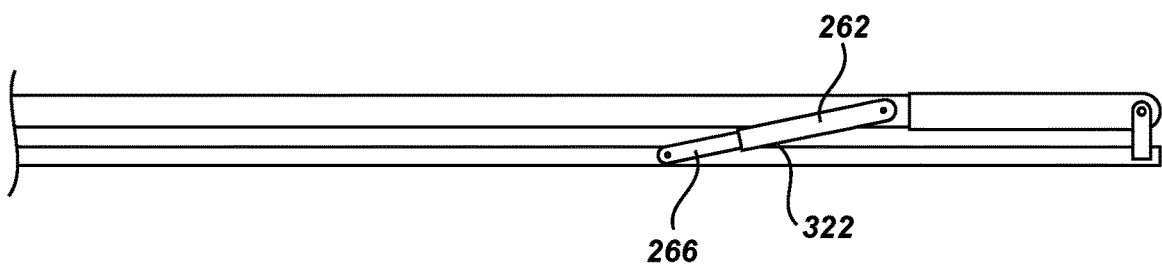
FIG. 19 is a side view of a portion of a rail system in accordance with the embodiment of FIG. 18, where the rail system is in a retracted position.

In further embodiments as illustrated in FIGS. 18-19, the retaining link 122 may comprise an extendable strut 322 rotatably attached to inner or outer surfaces of the rails 118, 218. The strut may comprise a rod 266 and a cylinder 262. When the moveable frame 128 is in the retracted position, the strut is compressed and the support rails 218 of the rotating frame 216 are generally parallel to the side rails 108 of the fixed frame. As the front of the moveable frame moves upward, the bearing 150 applies a force to the rotating frame 116, and the rotating frame rotates upward. The strut extends and rotates until it has reached its limit, thereby limiting the rotation of the rotating frame 116. In an additional embodiment, the retaining link may be a spring.

The channels 132, 156 of the rails 130, 118, 218 may be closed or blocked at the ends to prevent the bearing 150 from exiting the channel. In this manner, the moveable frame 128 is prevented from completely detaching from the fixed frame 106 and the angled rails 118 or rotating frame 116 when the moveable frame is slid toward back end 104 rail system.

Embodiments of the rail system illustrated in FIGS. 12-15 may comprise a rear cross bar 148a extending between the slide rails 130 of the moveable near or adjacent to the back end 104 of the rail system. A rod 180 may extend in a direction generally parallel to the slide rails between a back end 184 and a front end 182. The rod may extend through a hole formed through the rear cross bar and through a hole formed in a front cross bar 148b. The rod 180 may be rotatable within the holes. The rod may form part of a latch mechanism for holding the moveable frame 128 in place relative to the fixed frame 106.

The latch mechanism may further comprise a handle 186 that is attached to the rod near or adjacent to the back end 184 of the rod. The handle may be used to rotate the rod 180. In addition, embodiments of the latch mechanism may comprise a rear locking tab 188. The rear locking tab may extend from the rod 180 forward of the rear cross bar 148a. The locking tab may be rotatable together with the rod between a locked position in which the rear locking tab 188 engages the rear cross bar 148a and an unlocked position in which the tab is rotated such that it does not engage the rear cross bar.

The locking mechanism may further comprise a lock plate 190. The lock plate may be attached to the fixed frame 106. In embodiments of the locking mechanism, the lock plate may be attached to a front cross bar 110b and further may extend between a front cross bar 110b and an intermediate cross bar 110c. The lock plate 190 may have a lock notch 192 and a retention notch 194 formed in the plate. The lock notch may be forward of the retention notch. A forward locking tab 196 may extend from the rod 180 and alternatively engage the lock notch 192 or the retention notch 194. The lock notch may have straight edges or other features that prevent the moveable frame from sliding laterally once the forward locking tab 196 has engaged the lock notch 192. The retention notch may have angled edges or other features that provide resistance to sliding of the moveable once the forward locking tab 196 has engaged the retention notch 194 but do not completely prevent movement.

In this manner, the moveable frame may be moved from the extended position to a first retracted position (FIG. 14) where the forward locking tab 196 engages the retention notch 194, and the moveable frame is retained but not locked. The moveable frame could then be extended again without requiring actuation of the handle 186. If more secure locking is desired, the moveable frame could be pushed forward from the first retracted position to a second retracted position (FIG. 15) where the forward locking tab 196 engages the locking notch 192, and the moveable frame is locked against further extension until the handle 186 is actuated. The locking mechanism may further comprise one or more biasing elements, such as a spring, that biases rotation of the locking mechanism in such a way that the locking tab 196 engages the retention or locking notches.

The forward locking tab 196 and rear locking tab 188 may be in the same plane or in different planes. Additionally, forward locking tab 196 and rear locking tab 188 may rotate together or may rotate separately or in staged rotation either one before the other or in depending on the degree of rotation of the handle 186 and/or rod 180. Further, the rod 180 may be formed of a single piece with the forward and rear locking tabs 188, 196 attached to the single piece, or the rod may be formed from multiple elements, including elements that rotate in different degrees.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A rail system for attachment to a vehicle:
a fixed frame having a front end, a back end, and first and second sides, the fixed frame comprising a side rail and a linear support rail attached to the side rail such that a distance between the side rail and support rail increases continuously from the forward end of the support rail toward a rearward end of the support rail;
a moveable frame having a front end, a back end, and first and second sides, the moveable frame comprising a slide rail, the front end of the moveable frame being moveably connected with the fixed frame linear support rail;
wherein the moveable frame is movable between a retracted position in which the moveable frame is positioned substantially horizontally and substantially within a perimeter of the fixed frame, and an extended position in which the moveable frame has translated so that at least a portion of the moveable frame extends beyond the fixed frame and has rotated so that the back end of the moveable frame is lower than the front end of the moveable frame.

2. The rail system of claim 1, wherein the back end of the moveable frame is lower than the fixed frame in the extended position.

3. The rail system of claim 1, wherein the front end of the moveable frame is higher than the fixed frame in the extended position.

4. A rail system for attachment to a vehicle:
a fixed frame having a front end, a back end, and first and second sides, the fixed frame comprising a side rail and a linear support rail attached to the side rail, the linear support rail comprising a channel having an inwardly facing opening;
a moveable frame having a front end, a back end, and first and second sides, the moveable frame comprising a slide rail and being moveably connected with the fixed frame, wherein the moveable frame slide rail is positioned inwardly of the fixed frame support rail, the moveable frame further comprising a shaft extending outwardly from the moveable frame slide rail adjacent to the moveable frame front end, the shaft supporting a bearing that moves within the fixed frame linear support rail channel;
wherein the moveable frame is movable between a retracted position in which the moveable frame is positioned substantially horizontally and substantially within a perimeter of the fixed frame, and an extended position in which the moveable frame has translated so that at least a portion of the moveable frame extends beyond the fixed frame and has rotated so that the back end of the moveable frame is lower than the front end of the moveable frame; and
wherein the fixed frame support rail is attached to the fixed frame side rail at a predetermined angle such that a distance between the side rail and support rail increases continuously from the forward end of the support rail toward a rearward end of the support rail.

5. The rail system of claim 4, wherein moveable frame has a center of gravity that is positioned within the perimeter of the fixed frame when the moveable frame is in a retracted position and beyond the back end of the fixed frame when the moveable frame is in the extended position.

6. The rail system of claim 5, wherein the moveable frame bearing is biased against an upper surface of the support rail channel when the moveable frame center of gravity is beyond the back end of the fixed frame, and the moveable frame bearing is biased against a lower surface of the support rail channel when the moveable frame center of gravity is within the perimeter of the fixed frame.

7. The rail system of claim 1 further comprising a first bearing connecting a rearward end of the fixed frame side rail with the moveable frame slide rail.

8. The rail system of claim 7, wherein the first bearing comprises a roller attached to a support post extending from the fixed frame side rail.

9. The rail system of claim 8, wherein the roller travels within a channel formed in the moveable frame slide rail when the moveable frame moves between the retracted and extended positions.

10. The rail system of claim 7 further comprising a second bearing connecting the moveable frame slide rail with the fixed frame support rail at a position forward of the first bearing.

11. The rail system of claim 1 further comprising a latch that restricts movement of the moveable frame relative to the fixed frame.

12. The rail system of claim 11, wherein the latch comprises a locking tab that is moveable between an engaged position and a disengaged position.

13. The rail system of claim 12, wherein the latch further comprises a rotatable rod to which the locking tab is attached, and wherein rotating the rod moves the locking tab between the engaged and disengaged positions.

14. The rail system of claim 13, wherein the latch further comprises a handle attached to the rotatable rod.

15. The rail system of claim 12, wherein the latch further comprises a locking plate, the locking plate comprising a locking notch that engages the locking tab and prevents movement of the moveable frame relative to the fixed frame when the locking tab has engaged the lock notch.

16. The rail system of claim 15, wherein the locking plate further comprises a retention notch that engages the locking tab and provides resistance to movement of the moveable frame relative to the fixed frame when the locking tab has engaged the retention notch.

17. The rail system of claim 16, wherein the locking notch is positioned forward of the retention notch such that the moveable frame is be moved from the extended position to a first retracted position where the locking tab engages the retention notch thereby restricting movement of the moveable frame relative to the fixed frame, and the moveable frame is further moved from the first retracted position to a second retracted position where the locking tab engages the locking notch thereby preventing movement of the movable frame relative to the fixed frame.

* * * * *